United States Patent
Chin et al.

(10) Patent No.: US 8,542,666 B2
(45) Date of Patent: Sep. 24, 2013

(54) METHOD AND APPARATUS FOR POWER EFFICIENT IDLE OPERATION IN A DUAL SIM CDMA EVDO MOBILE STATION

(75) Inventors: Tom Chin, San Diego, CA (US);
Guangming Shi, San Diego, CA (US);
Kuo-Chun Lee, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 336 days.

(21) Appl. No.: 12/846,518

(22) Filed: Jul. 29, 2010

(65) Prior Publication Data
US 2012/0027003 A1 Feb. 2, 2012

(51) Int. Cl.
*H04J 3/06* (2006.01)

(52) U.S. Cl.
USPC ........................................................ 370/350

(58) Field of Classification Search
USPC ............... 370/328–350; 455/426.1, 458, 515
See application file for complete search history.

(56) References Cited

U.S. PATENT DOCUMENTS

| | | | |
|---|---|---|---|
| 8,175,621 B2 * | 5/2012 | Hsu ................................ | 455/458 |
| 2003/0125073 A1 | 7/2003 | Tsai et al. | |
| 2004/0023672 A1 | 2/2004 | Terry | |
| 2008/0261628 A1 * | 10/2008 | Proctor et al. ................. | 455/458 |
| 2009/0279517 A1 * | 11/2009 | Chin et al. ..................... | 370/338 |
| 2010/0093378 A1 | 4/2010 | Chin et al. | |
| 2011/0122809 A1 * | 5/2011 | Yun et al. ....................... | 370/328 |
| 2011/0312361 A1 * | 12/2011 | Nair et al. ...................... | 455/509 |
| 2012/0088501 A1 * | 4/2012 | Chin et al. ..................... | 455/433 |

OTHER PUBLICATIONS

International Search Report and Written Opinion—PCT/US2011/046023—ISA/EPO—Dec. 13, 2011.

* cited by examiner

*Primary Examiner* — Frank Duong
(74) *Attorney, Agent, or Firm* — Kristine U. Ekwueme

(57) ABSTRACT

Methods and apparatus for configuring and scheduling paging intervals for a mobile station (MS) having multiple subscriber identity modules (SIMs) to be aligned are provided. The MS having multiple SIMs may operate in a network via a particular radio access technology (RAT), such as Code Division Multiple Access (CDMA) EVDO (Evolution-Data Optimized). By having aligned paging intervals, the MS may wake up only once during the paging cycles for the various SIMs rather than waking up multiple times, thereby reducing power consumption of the MS during idle mode compared to a conventional MS with multiple SIMs.

36 Claims, 7 Drawing Sheets

| Slot Cycle | Slots | CC Cycles | Sleep Period (sec) |
|---|---|---|---|
| 0 | 4 | 0.015625 | 0.006667 |
| 1 | 8 | 0.03125 | 0.013333 |
| 2 | 16 | 0.0625 | 0.026667 |
| 3 | 32 | 0.125 | 0.053333 |
| 4 | 64 | 0.25 | 0.106667 |
| 5 | 128 | 0.5 | 0.213333 |
| 6 | 256 | 1 | 0.426667 |
| 7 | 768 | 3 | 1.28 |
| 8 | 1536 | 6 | 2.56 |
| 9 | 3072 | 12 | 5.12 |
| 10 | 6144 | 24 | 10.24 |
| 11 | 12288 | 48 | 20.48 |
| 12 | 24576 | 96 | 40.96 |
| 13 | 49152 | 192 | 81.92 |
| 14 | 98304 | 384 | 163.84 |
| 15 | 196608 | 768 | 327.68 |

METHOD AND APPARATUS FOR POWER EFFICIENT IDLE OPERATION IN A DUAL SIM CDMA EVDO MOBILE STATION

BACKGROUND

1. Field

Certain aspects of the present disclosure generally relate to wireless communications and, more particularly, to configuring and scheduling paging intervals for a mobile station (MS) having multiple subscriber identity modules (SIMs) to be aligned in an effort to reduce power consumption during an idle mode.

2. Background

Wireless communication networks are widely deployed to provide various communication services such as telephony, video, data, messaging, broadcasts, and so on. Such networks, which are usually multiple access networks, support communications for multiple users by sharing the available network resources. For example, one network may be a 3G (the third generation of mobile phone standards and technology) system, which may provide network service via any one of various 3G RATs including EVDO (Evolution-Data Optimized), 1xRTT (1 times Radio Transmission Technology, or simply 1x), W-CDMA (Wideband Code Division Multiple Access), UMTS-TDD (Universal Mobile Telecommunications System-Time Division Duplexing), HSPA (High Speed Packet Access), GPRS (General Packet Radio Service), and EDGE (Enhanced Data rates for Global Evolution). The 3G network is a wide area cellular telephone network that evolved to incorporate high-speed internet access and video telephony, in addition to voice calls. Furthermore, a 3G network may be more established and provide larger coverage areas than other network systems.

CDMA EVDO is a 3G telecommunications standard for the wireless transmission of data through radio signals, typically for broadband Internet access. EVDO uses multiplexing techniques including code division multiple access (CDMA) and time division multiple access (TDMA) to increase both individual users' throughput and the overall system throughput. EVDO is standardized by 3rd Generation Partnership Project 2 (3GPP2) as part of the CDMA2000 family of standards and has been adopted by many mobile phone service providers around the globe.

EVDO was designed as an evolution of the CDMA2000 (IS-2000) standard to support high data rates and be deployed alongside a wireless carrier's voice services. An EVDO channel has a bandwidth of 1.25 MHz similar to IS-95A (IS-95) and IS-2000 (1xRTT). The channel structure, on the other hand, is very different. Furthermore, the back-end network is entirely packet-based, and thus, is not constrained by the restrictions typically present on a circuit-switched network.

There have been several revisions of the EVDO standard, starting with Revision 0 (Rev 0). This was later expanded upon with Revision A (Rev A) to support Quality of Service (QoS) (e.g., to improve latency) and higher rates on the forward link and reverse link. Later in 2006 Revision B (Rev B) was published that, among other features, includes the ability to bundle multiple carriers to achieve even higher rates and lower latencies (see TIA-856 Rev B).

EVDO provides access to mobile devices with forward link air interface speeds of up to about 2.4 Mbit/s with Rev 0 and up to about 3.1 Mbit/s with Rev A. The reverse link rate for Rev 0 can operate up to about 153 kbit/s, while Rev A can operate at up to about 1.8 Mbit/s. EVDO was designed to be operated as an IP (Internet Protocol)-based network and can therefore support any application which can operate on such a network and bit rate constraints.

SUMMARY

In an aspect of the disclosure, a method for communicating with a mobile station (MS) in a network via a radio access technology (RAT) is provided. The method generally includes configuring a first paging interval for a first subscriber identity and configuring a second paging interval for a second subscriber identity, such that the first and second paging intervals are aligned.

In an aspect of the disclosure, an apparatus for communicating in a network via a RAT is provided. The apparatus generally includes means for configuring a first paging interval for a first subscriber identity and means for configuring a second paging interval for a second subscriber identity, such that the first and second paging intervals are aligned.

In an aspect of the disclosure, an apparatus for communicating in a network via a RAT is provided. The apparatus generally includes at least one processor and a memory coupled to the at least one processor. The at least one processor is typically configured to configure a first paging interval for a first subscriber identity and to configure a second paging interval for a second subscriber identity, such that the first and second paging intervals are aligned;

In an aspect of the disclosure, a computer-program product for communicating with an MS in a network via a RAT is provided. The computer-program product generally includes a computer-readable medium having code for configuring a first paging interval for a first subscriber identity and configuring a second paging interval for a second subscriber identity, such that the first and second paging intervals are aligned.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

An Example Wireless Communication System

The methods and apparatus of the present disclosure may be utilized in a broadband wireless communication system. The term "broadband wireless" refers to technology that provides wireless, voice, Internet, and/or data network access over a given area. The various concepts presented throughout this disclosure may be implemented across a broad variety of telecommunication systems, network architectures, and communication standards. By way of example and without limitation, the aspects of the present disclosure illustrated in FIG. 1 are presented mainly with reference to a CDMA EVDO system.

Figure 1:
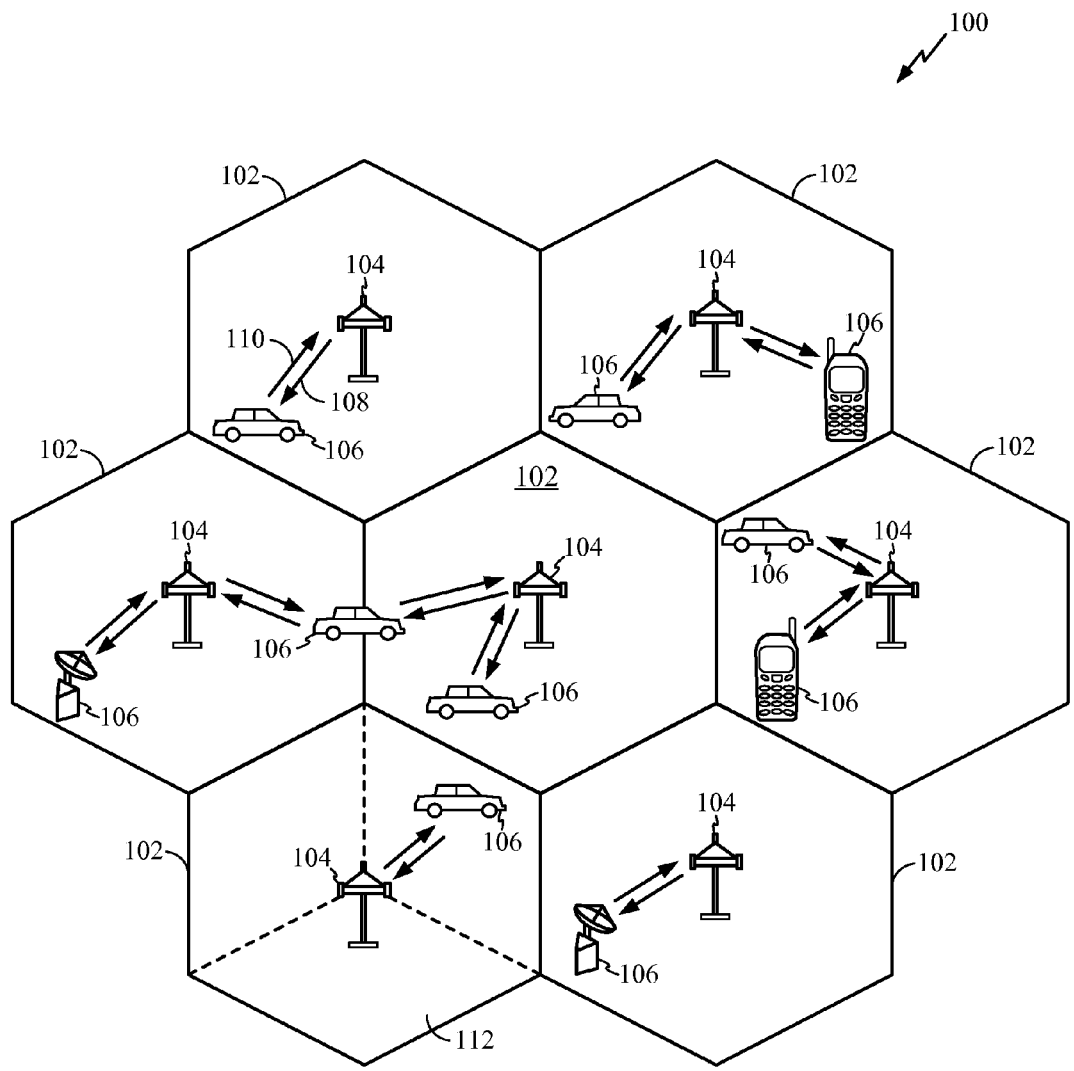
FIG. 1 is a block diagram conceptually illustrating an example of a wireless communication system in accordance with certain aspects of the present disclosure.

FIG. 1 illustrates an example of a wireless communication system 100. The wireless communication system 100 may be a broadband wireless communication system. The wireless communication system 100 may provide communication for a number of cells 102, each of which is serviced by a base station (BS) 104. A base station 104 may be a fixed station that communicates with mobile stations 106. The base station 104 may alternatively be referred to as a Node B, a base transceiver station (BTS), a radio base station, a radio transceiver, a transceiver function, a basic service set (BSS), an extended service set (ESS), an access point (AP), or some other suitable terminology.

FIG. 1 depicts various mobile stations 106 dispersed throughout the system 100. The mobile stations 106 may be fixed (i.e., stationary) or mobile. A mobile station (MS) 106 may alternatively be referred to by those skilled in the art as a user terminal, a remote station, a subscriber station, a station (STA), user equipment (UE), a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Examples of a mobile station 106 include a cellular phone, a smart phone, a session initiation protocol (SIP) phone, a laptop, a notebook, a netbook, a smartbook, a wireless modem, a personal digital assistant (PDA), a satellite radio, a global positioning system (GPS) device, a multimedia device, a video device, a digital audio player (e.g., MP3 player), a camera, a game console, a handheld device, or any other similar functioning device.

A variety of algorithms and methods may be used for transmissions in the wireless communication system 100 between the base stations 104 and the mobile stations 106. For example, signals may be sent and received between the base stations 104 and the mobile stations 106 in accordance with the CDMA EVDO techniques. In these case, the wireless communication system 100 may be referred to as a CDMA EVDO system.

A communication link that facilitates transmission from a base station 104 to a mobile station 106 may be referred to as a downlink 108, and a communication link that facilitates transmission from a mobile station 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
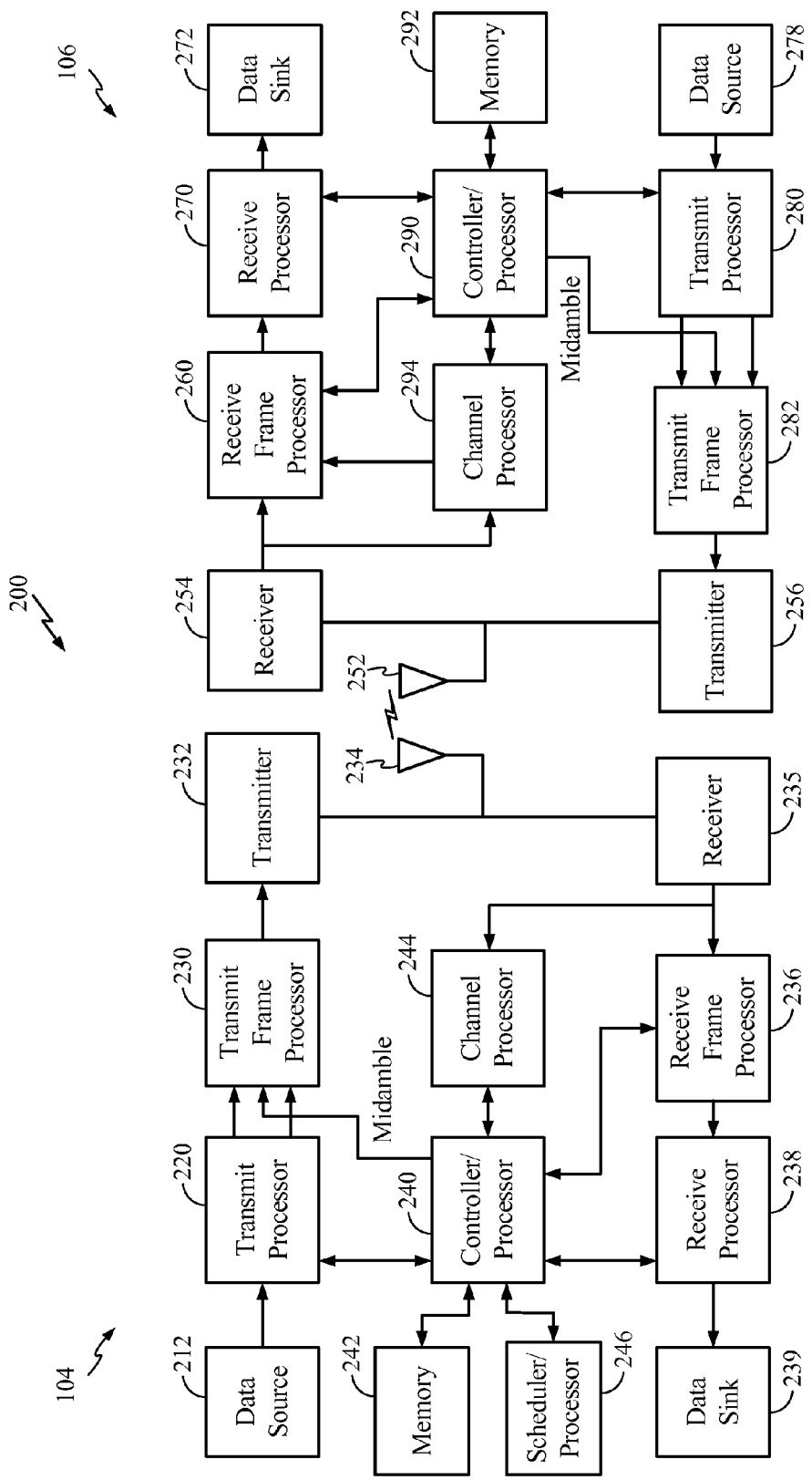
FIG. 2 is a block diagram conceptually illustrating an example of a base station (BS) in communication with a mobile station (MS) in a wireless communication system in accordance with certain aspects of the present disclosure.

FIG. 2 is a block diagram of a BS 104 in communication with an MS 106 in a network 200 operating according to a particular radio access technology (RAT). In the downlink communication, a transmit processor 220 may receive data from a data source 212 and control signals from a controller/processor 240. The transmit processor 220 provides various signal processing functions for the data and control signals, as well as reference signals (e.g., pilot signals). For example, the transmit processor 220 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 244 may be used by a controller/processor 240 to determine the coding, modulation, spreading, and/or scrambling schemes for the transmit processor 220. These channel estimates may be derived from a reference signal transmitted by the MS 106. The symbols generated by the transmit processor 220 are provided to a transmit frame processor 230 to create a frame structure. The frames are then provided to a transmitter 232, which provides various signal conditioning functions including amplifying, filtering, and modulating the frames onto a carrier for downlink transmission over the wireless medium through antennas 234. The antennas 234 may be implemented with beam steering bidirectional adaptive antenna arrays or other similar beam technologies.

At the MS 106, a receiver 254 receives the downlink transmission through an antenna 252 and processes the transmission to recover the information modulated onto the carrier. The information recovered by the receiver 254 is provided to a receive frame processor 260, which parses each frame, and may provides a portion to a channel processor 294 and the data, control, and reference signals to a receive processor 270. The receive processor 270 then performs the inverse of the processing performed by the transmit processor 220 in the BS 104. More specifically, the receive processor 270 descrambles and despreads the symbols, and then determines the most likely signal constellation points transmitted by the BS 104 based on the modulation scheme. These soft decisions may be based on channel estimates computed by the channel processor 294. The soft decisions are then decoded and deinterleaved to recover the data, control, and reference signals. The CRC codes are then checked to determine whether the frames were successfully decoded. The data carried by the successfully decoded frames will then be provided to a data sink 272, which represents applications running in the MS 106 and/or various user interfaces (e.g., display). Control signals carried by successfully decoded frames will be provided to a controller/processor 290. When frames are unsuccessfully decoded by the receiver processor 270, the controller/processor 290 may also use an acknowledgement (ACK) and/or negative acknowledgement (NACK) protocol to support retransmission requests for those frames.

In the uplink, data from a data source 278 and control signals from the controller/processor 290 are provided to a transmit processor 280. The data source 278 may represent applications running in the MS 106 and various user interfaces (e.g., keyboard). Similar to the functionality described in connection with the downlink transmission by the BS 104, the transmit processor 280 provides various signal processing functions including CRC codes, coding and interleaving to facilitate FEC, mapping to signal constellations, spreading with OVSFs, and scrambling to produce a series of symbols. Channel estimates, derived by the channel processor 294 from a reference signal transmitted by the BS 104, may be used to select the appropriate coding, modulation, spreading, and/or scrambling schemes. The symbols produced by the transmit processor 280 will be provided to a transmit frame processor 282 to create a frame structure. The frames are then provided to a transmitter 256, which provides various signal conditioning functions including amplification, filtering, and modulating the frames onto a carrier for uplink transmission over the wireless medium through the antenna 252.

The uplink transmission is processed at the BS 104 in a manner similar to that described in connection with the receiver function at the MS 106. A receiver 235 receives the uplink transmission through the antenna 234 and processes the transmission to recover the information modulated onto the carrier. The information recovered by the receiver 235 is provided to a receive frame processor 236, which parses each frame, and provides a portion to the channel processor 244 and the data, control, and reference signals to a receive processor 238. The receive processor 238 performs the inverse of the processing performed by the transmit processor 280 in the MS 106. The data and control signals carried by the successfully decoded frames may then be provided to a data sink 239 and the controller/processor, respectively. If some of the frames were unsuccessfully decoded by the receive processor, the controller/processor 240 may also use an acknowledgement (ACK) and/or negative acknowledgement (NACK) protocol to support retransmission requests for those frames.

The controller/processors 240 and 290 may be used to direct the operation at the BS 104 and the MS 106, respectively. For example, the controller/processors 240 and 290 may provide various functions including timing, peripheral interfaces, voltage regulation, power management, and other control functions. The computer-readable media of memories 242 and 292 may store data and software for the BS 104 and the MS 106, respectively. A scheduler/processor 246 at the BS 104 may be used to allocate resources to the MSs and schedule downlink and/or uplink transmissions for the MSs.

An Example Method for Power Efficient Idle Operation in a Dual SIM CDMA EVDO Mobile Station In CDMA EVDO, the MS 106 in a slotted idle state will listen to a certain Control Channel Cycle (CCC). Each CCC has 256 slots or 426.67 ms (each slot lasts for 5/3 ms).

Figures 3, 4:
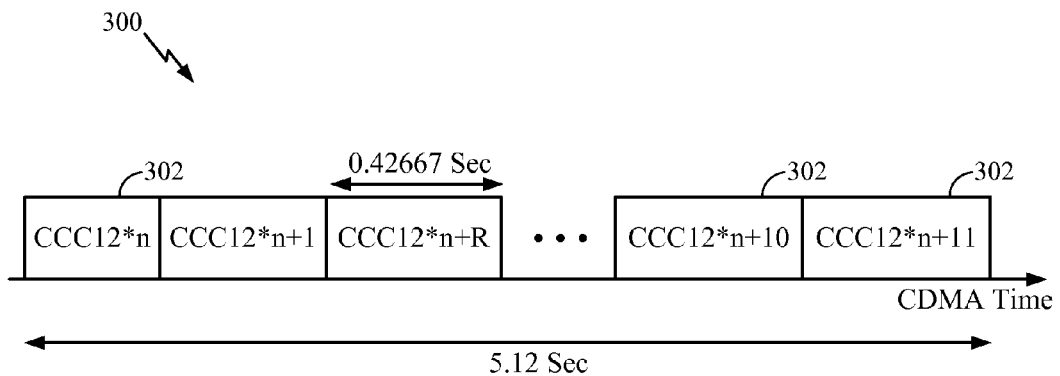
FIG. 3 illustrates an example Code Division Multiple Access (CDMA) Evolution-Data Optimized (EVDO) Rev 0 wake up time schedule, in accordance with certain aspects of the present disclosure.
FIG. 4 illustrates various CDMA EVDO Rev A sleep period values, in accordance with certain aspects of the present disclosure.

In EVDO Rev 0, the idle state protocol may allow the MS 106 to wake up for one CCC per 5.12 seconds, where 12 CCCs are available per 5.12 seconds. FIG. 3 illustrates an example CDMA EVDO Rev 0 wake up time schedule 300. Each CCC 302 has an index starting from the beginning of the CDMA System Time. The MS shall wake up on a CCC with index C satisfying:

$$(C+R) \bmod 12 = 0$$

The above parameter R may be set by either of the following options: (1) performing a random generation algorithm specified in the CDMA standards or (2) using an MS-preferred value, called PreferredControlChannelCycle. The MS may choose the above option (1) or (2) by setting a PreferredControlChannelCycleEnabled parameter to '0' or '1,' respectively. If the MS 106 decides to set the PreferredControlChannelCycle, the MS may use Generic Configuration Protocol to set this value by transmitting an EVDO Configuration Request message.

In EVDO Rev A, however, the enhanced idle state protocol may allow the MS 106 to wake up for a few possible sleep periods between 4 slots (or SlotCycle0) and 196608 slots (or SlotCycle15). The table 400 illustrated in FIG. 4 shows various CDMA EVDO Rev A sleep period values. To conserve battery power, however, aspects of the present disclosure may only consider sleep periods greater than one CCC (i.e., the Slot Cycle is 7 or above in the table 400).

EVDO Rev A protocols also allow the MS 106 to sleep with multiple stages of sleep periods: Period1, Period2, and Period3, subsequently. However, the final sleep period (i.e., Period3) will represent the final sleep period, and thus, Period3 is of interest according to aspects of the present disclosure.

EVDO Rev A specifies that the MS shall wake up at the slot:

$$[T+256*R] \bmod \text{Period} = \text{Offset}$$

where Offset is 0, 1, 2, or 3 slots. This is in fact equivalent to CCC index C satisfying:

$$(C+R) \bmod P = 0, \text{ where } P = \text{Period3}/256$$

The above parameter R in EVDO Rev A may be set similar to Rev 0, either by a random generation formula or the PreferredControlChannelCycle.

In China and other countries, it is popular to operate a mobile station 106 with dual subscriber identity modules (SIMs). With two (or more) SIMs, a user can make and receive mobile calls with different phone numbers.

An MS with multiple SIMs may perform the EVDO registration procedures for each SIM independently. The EVDO registration procedure may include a Universal Access Terminal ID (UATI) assignment, an EVDO session setup, and a Point-to-Point Protocol (PPP) session setup. After completing the registration to the EVDO network for the multiple SIMs, the MS may enter the idle state.

In general, the MS may monitor EVDO paging messages according to different paging intervals (i.e., in terms of CCCs) because the EVDO sessions for the multiple SIMs may be assigned with different parameter R values. Consequently, if the MS has dual SIMs, the MS may have to monitor for paging messages twice as long as an MS with only one SIM (i.e., a single phone number).

Figures 5, 9:
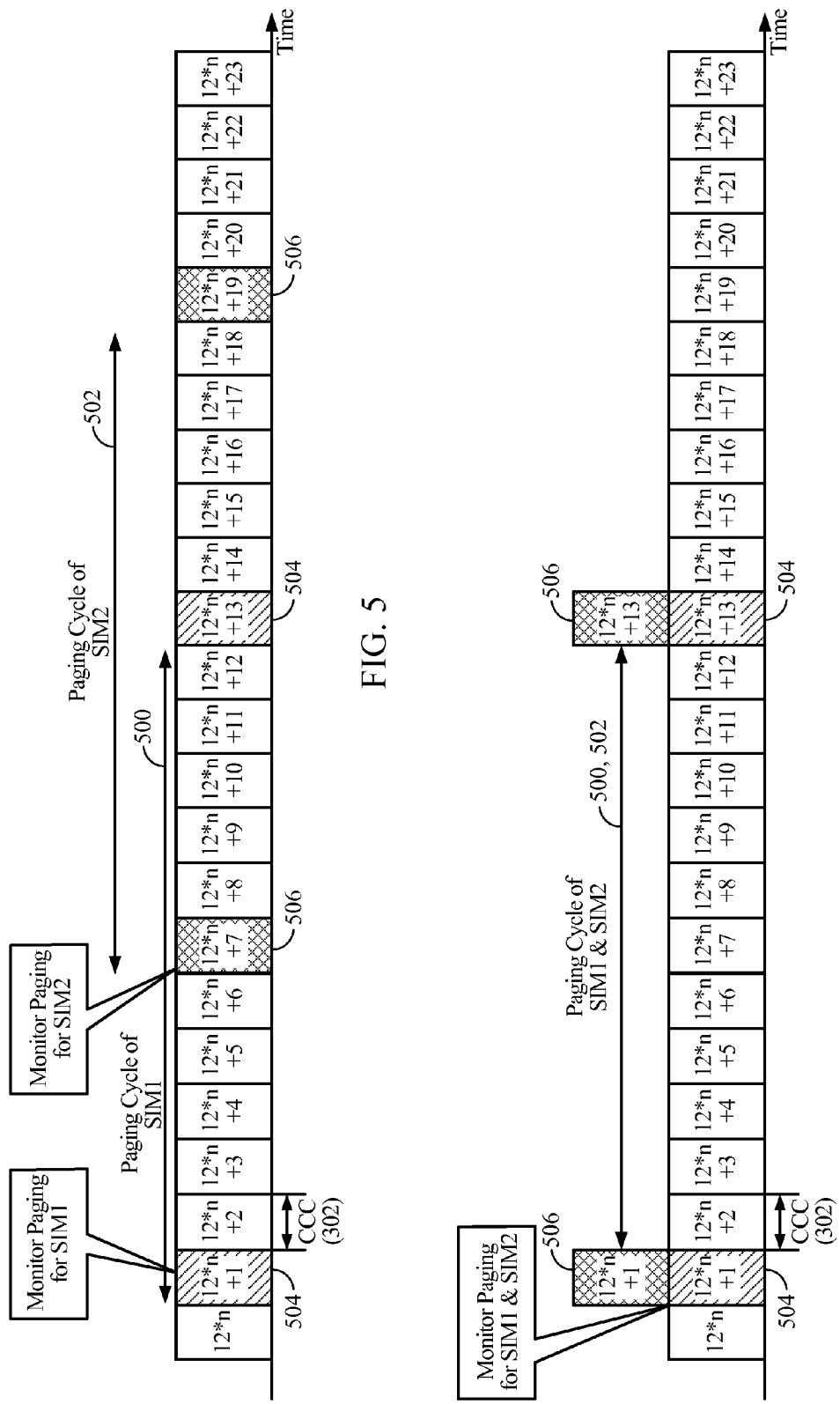
FIG. 5 illustrates the paging intervals for two different subscriber identity modules (SIMs) in a single mobile station (MS) being offset in terms of control channel cycles (CCCs), in accordance with certain aspects of the present disclosure.
FIG. 9 illustrates the paging intervals for two different SIMs in a single MS being completely aligned in terms of CCCs, in accordance with certain aspects of the present disclosure.

As an example, FIG. 5 illustrates the paging cycle 500 for a first SIM (SIM1) and the paging cycle 502 for a second SIM (SIM2). In FIG. 5, the paging intervals 504 for SIM1 are offset six CCCs 302 from the paging intervals 506 for SIM2. Since the MS may most likely wake up from the idle state during the paging intervals 504, 506 to listen for any paging messages, the power consumption of a dual-SIM MS may be approximately double that of a single-SIM MS during the idle state.

Accordingly, what is needed are techniques and apparatus for reducing the power consumption during idle mode for an MS with multiple SIMs.

Figure 6:
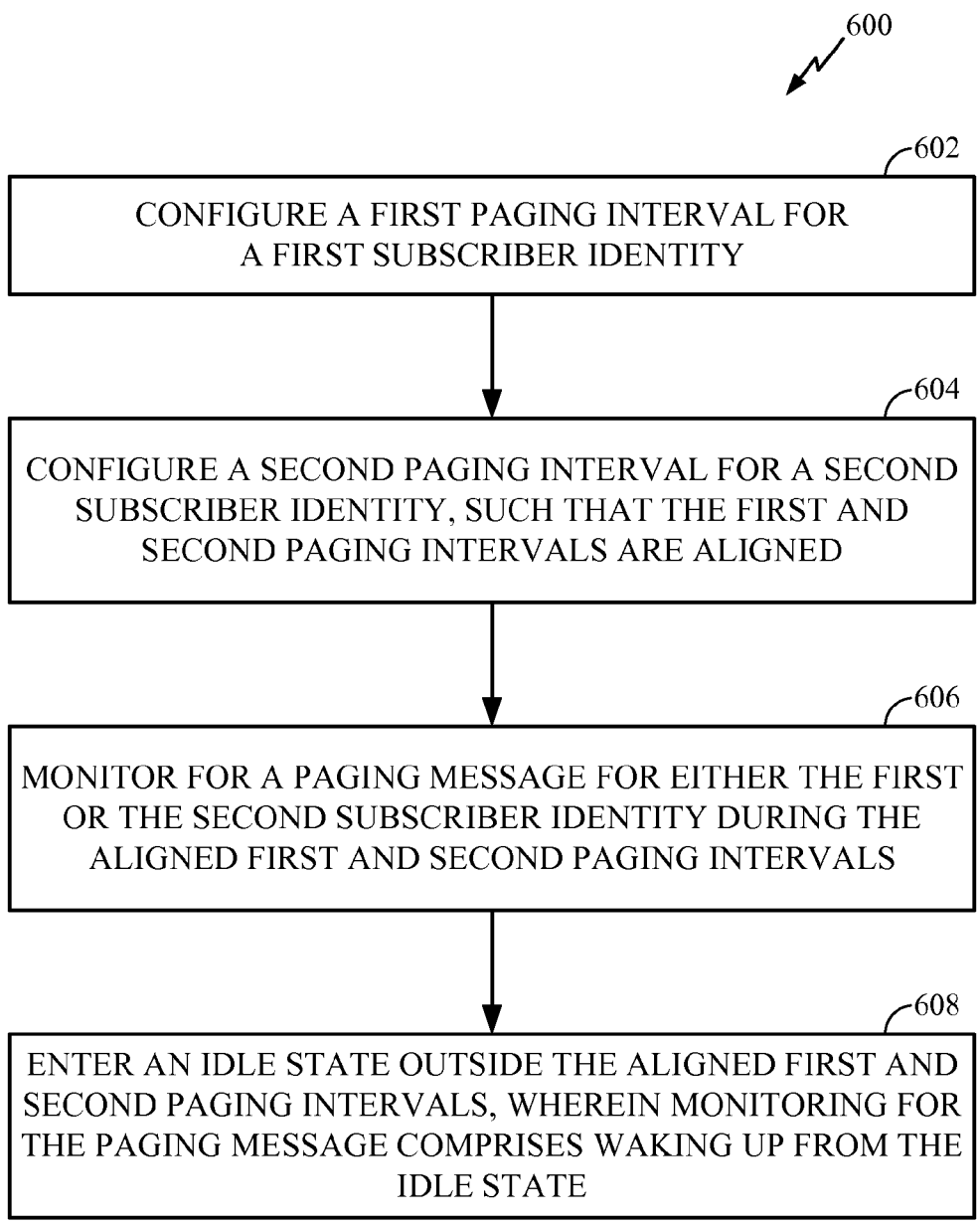
FIG. 6 is a functional block diagram conceptually illustrating example blocks executed to configure paging intervals for a mobile station (MS) having multiple subscriber identities such that the paging intervals for the multiple subscriber identities are aligned, in accordance with certain aspects of the present disclosure.

FIG. 6 is a functional block diagram conceptually illustrating example blocks 600 executed to configure paging intervals for an MS having multiple subscriber identities such that the paging intervals for the multiple subscriber identities are aligned. Operations illustrated by the blocks 600 may be executed, for example, at the processor(s) 270, 280, and/or 290 of the MS 106 from FIG. 2.

The operations may begin, at block 602, by configuring a first paging interval for a first subscriber identity. At block 604, a second paging interval for a second subscriber identify may be configured, such that the first and second paging intervals are aligned (e.g., completely aligned or, in other words, the same). The configurations of the first and second paging intervals may be performed by the MS 106 (e.g., by sending a Configuration Request as described below) or by the BS 104 (e.g., by scheduling the paging cycles with the first and second paging intervals for the particular MS based on the received Configuration Request, as described below). The MS may monitor for a paging message for the first and/or the second subscriber identity during the aligned first and second paging intervals at block 606. At block 608, the MS may enter an idle state outside the aligned first and second paging intervals. During the idle state, at least a portion of the MS may be powered down in an effort to conserve battery power. In order to listen for the paging message at 606, the MS may wake up from the idle state, powering up at least some of the components of the MS that were powered down during the idle state.

Certain aspects of the present disclosure configure the first and second paging intervals to be aligned by controlling the parameter R value such that the CCC for monitoring the paging messages for the first and second subscriber identities is the same. Two different solutions are described below for setting the parameter R.

Figure 7:
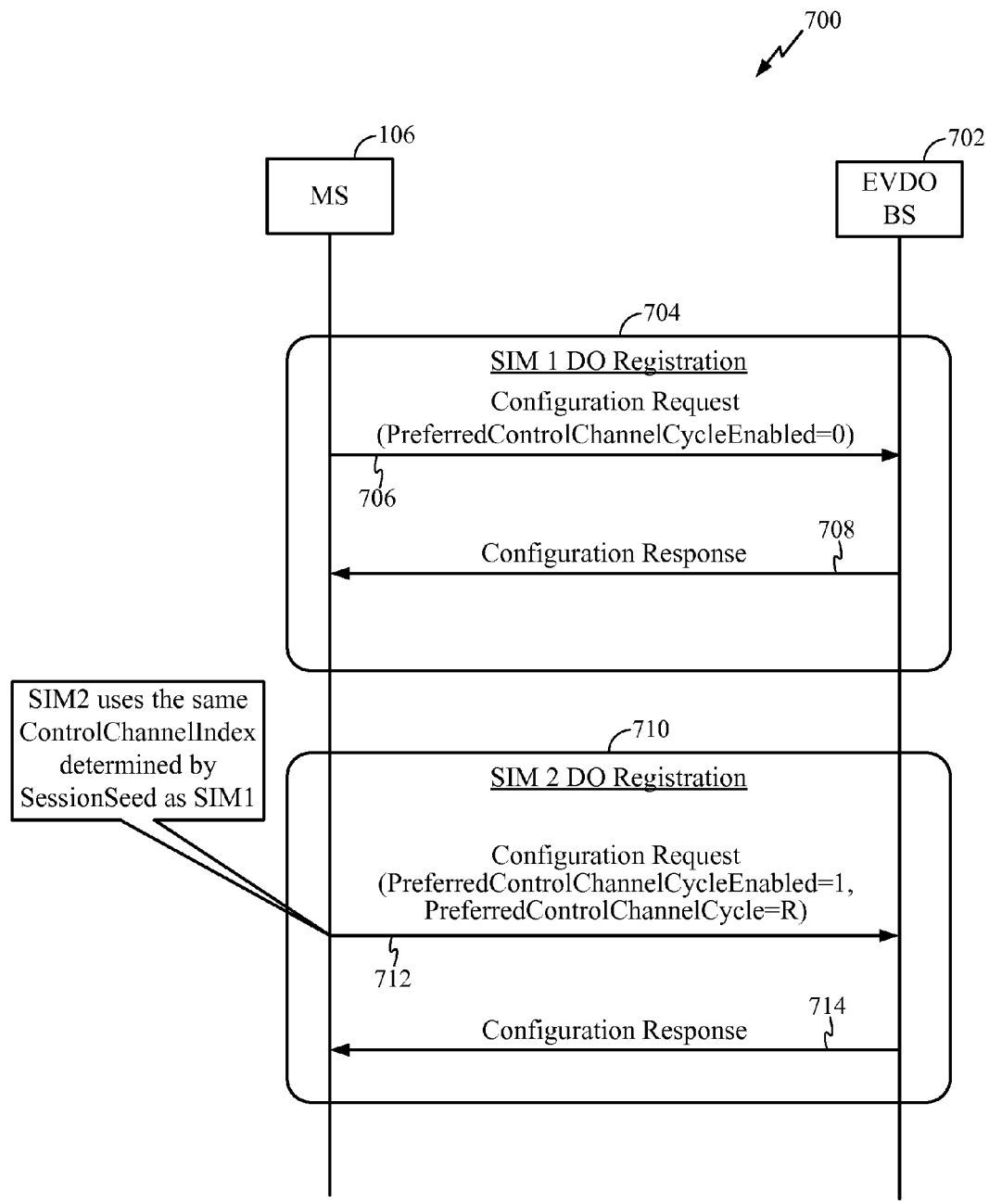
FIGS. 7 and 8 illustrate example call flows for configuring the paging intervals for a dual-SIM MS to be aligned, in accordance with certain aspects of the present disclosure.

FIG. 7 illustrates an example call flow 700 for configuring the paging intervals for a dual-SIM MS to be aligned according to one solution for setting the parameter R. The call flow 700 may occur between an EVDO BS 702 and the MS 106. At 704, the MS may perform a first EVDO registration in order to register SIM1. The first EVDO registration may involve using the random number SessionSeed in the (enhanced) idle state protocol. This random number generation may involve the MS 106 sending a Configuration Request at 706 to the EVDO BS 702 with PreferredControlChannelCycleEnabled set to 0, thereby disabling PreferredControlChannelCycle. At 708, the EVDO BS may respond with a Configuration Response having the parameter R set by the random number SessionSeed. Note that SessionSeed may be generated by the MS in the UATI assignment protocol.

At 710, the MS 106 may perform a second EVDO registration in order to register SIM2. For the second EVDO registration, the MS may use the preferred value of parameter R identical to the parameter R set by the random number SessionSeed from the EVDO registration for SIM1. In other words, the MS may send a Configuration Request at 712 with PreferredControlChannelCycleEnabled set to 1 (thereby enabling PreferredControlChannelCycle) and PreferredControlChannelCycle set to R. At 714, the EVDO BS 702 may respond with a Configuration Response agreeing to the request.

Figure 8:
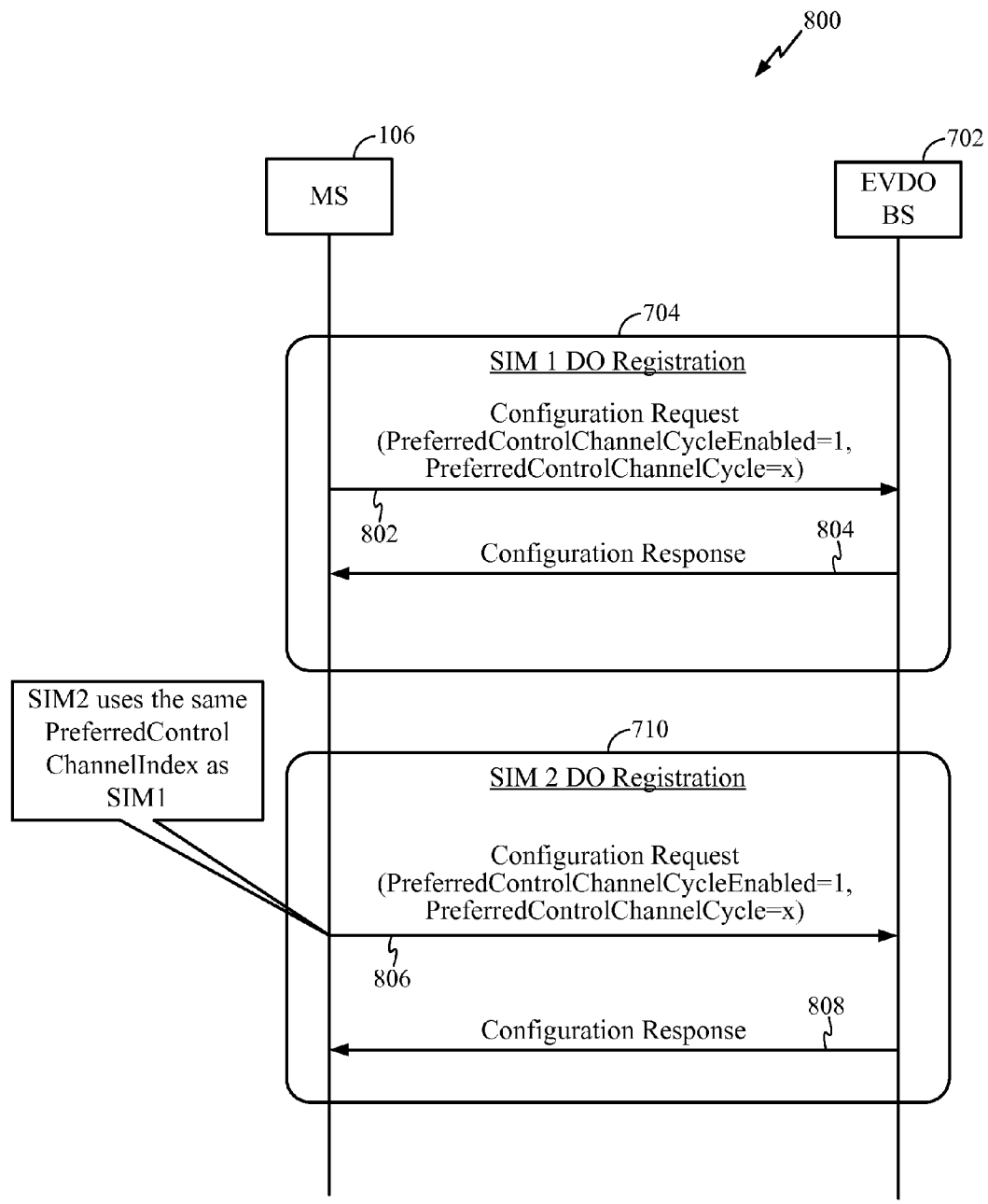

FIG. 8 illustrates an example call flow 800 for configuring the paging intervals for the dual-SIM MS to be aligned according to another solution for setting the parameter R. The call flow 800 may occur between the EVDO BS 702 and the MS 106. At 704, the MS may perform a first EVDO registration in order to register SIM1. For the first EVDO registration, the MS may use a preferred value of parameter R in the (enhanced) idle state protocol. Performing the first session configuration using this preferred value may involve the MS 106 sending a Configuration Request at 802 to the EVDO BS 702 with PreferredControlChannelCycleEnabled set to 1 (thereby enabling PreferredControlChannelCycle) and PreferredControlChannelCycle set to a selected value R, designated as x in FIG. 8. At 804, the EVDO BS may respond with a Configuration Response agreeing to the request.

At 710, the MS 106 may perform a second EVDO registration in order to register SIM2. For the second EVDO registration, the MS may use the preferred value of parameter R identical to the parameter R selected for the first EVDO registration. In other words, the MS may send a Configuration Request at 806 with PreferredControlChannelCycleEnabled set to 1 and PreferredControlChannelCycle set to x again. At 808, the EVDO BS 702 may respond with a Configuration Response agreeing to the request.

By using the same parameter R for SIM2 as was randomly generated (as in FIG. 7) or designated (as in FIG. 8) for SIM1, the paging intervals 504, 506 for both SIM1 and SIM2 may be completely aligned as illustrated in FIG. 9. The EVDO BS 702 may send a paging message for either SIM1 or SIM2 during particular CCCs—having indices C satisfying the R-dependent equations above—where the paging intervals 504, 506 for SIM1 and SIM2 are the same, and the dual-SIM MS may then wake up from an idle state to listen for a paging message during these particular CCCs. By having only a single paging monitoring interval during the paging cycles 500, 502 for SIM1 and SIM2, the power consumption of a dual-SIM MS may be approximately equal to that of a single-SIM MS during the idle state (and approximately half that of a conventional dual-SIM MS with non-aligned paging intervals).

In one configuration, the apparatus for wireless communication (such as an MS with multiple subscriber identities) includes means for configuring a first paging interval for a first subscriber identity and means for configuring a second paging interval for a second subscriber identity, such that the first and second paging intervals are aligned. For certain aspects, the apparatus further comprises means for monitoring for a paging message for either the first or the second subscriber identity during the aligned first and second paging intervals. For certain aspects, the apparatus further comprises means for entering an idle state outside the aligned first and second paging intervals, wherein the means for monitoring for the paging message is configured to wake up from the idle state. In one aspect, the aforementioned means may be the processor(s) 270, 280, and/or 290 configured to perform the functions recited by the aforementioned means. In another aspect, the aforementioned means may be a module or any apparatus configured to perform the functions recited by the aforementioned means.

Several aspects of a telecommunications system have been presented with reference to a CVDA EVDO system. As those skilled in the art will readily appreciate, various aspects described throughout this disclosure may be extended to other telecommunication systems, network architectures and communication standards. By way of example, various aspects may be extended to UMTS (Universal Mobile Telecommunications System) systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), TD-SCDMA, Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read-only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for communicating with a mobile station (MS) in a network via a radio access technology (RAT), comprising:
    configuring a first paging interval for a first subscriber identity of the mobile station; configuring a second paging interval for a second subscriber identity of the mobile station; and
    selecting a same paging interval parameter for the first subscriber identity and the second subscriber identity, such that the first and second paging intervals are aligned.

2. The method of claim 1, further comprising monitoring for a paging message for either the first or the second subscriber identity during the aligned first and second paging intervals.

3. The method of claim 2, further comprising entering an idle state outside the aligned first and second paging intervals, wherein the monitoring for the paging message comprises waking up from the idle state.

4. The method of claim 1, wherein the RAT comprises Code Division Multiple Access (CDMA) Evolution-Data Optimized (EVDO) and the aligned first and second paging intervals comprise the same control channel cycle (CCC).

5. The method of claim 4, wherein the CCC has an index C and the paging interval parameter comprises a parameter R satisfying (C+R)mod 12=0 according to EVDO Rev 0 or (C+R)mod P=0 according to EVDO Rev A, wherein P=Period 3/256, and wherein Period3 is a sleep period specified in EVDO Rev A.

6. The method of claim 5, wherein the configuring the first paging interval comprises performing a first EVDO registration for the first subscriber identity and wherein the configuring the second paging interval comprises performing a second EVDO registration for the second subscriber identity based on the same parameter R from the first EVDO registration.

7. The method of claim 6, wherein the configuring the first paging interval comprises performing the first EVDO registration for the first subscriber identity using a random number SessionSeed to generate the parameter R and wherein the configuring the second paging interval comprises performing the second EVDO registration for the second subscriber identity by transmitting a Configuration Request with a Preferred Control Channel Cycle set to the parameter R.

8. The method of claim 6, wherein the configuring the first paging interval comprises performing the first EVDO registration for the first subscriber identity by:
    selecting the parameter R; and
    transmitting a first Configuration Request with a first Preferred Control Channel Cycle set to the selected parameter R; and
    wherein the configuring the second paging interval comprises performing the second EVDO registration for the second subscriber identity by transmitting a second Configuration Request with a second Preferred Control Channel Cycle set to the same selected parameter R.

9. The method of claim 1, wherein the configuring the first paging interval and the configuring the second paging interval are both performed by the MS.

10. An apparatus for communicating in a network via a radio access technology (RAT), comprising:
    means for configuring a first paging interval for a first subscriber identity;
    means for configuring a second paging interval for a second subscriber identity; and
    means for selecting a same paging interval parameter for the first subscriber identity and the second subscriber identity, such that the first and second paging intervals are aligned.

11. The apparatus of claim 10, further comprising means for monitoring for a paging message for either the first or the second subscriber identity during the aligned first and second paging intervals.

12. The apparatus of claim 11, further comprising means for entering an idle state outside the aligned first and second paging intervals, wherein the means for monitoring for the paging message is configured to wake up from the idle state.

13. The apparatus of claim 10, wherein the RAT comprises Code Division Multiple Access (CDMA) Evolution-Data Optimized (EVDO) and the aligned first and second paging intervals comprise the same control channel cycle (CCC).

14. The apparatus of claim 13, wherein the CCC has an index C and the paging interval parameter comprises a parameter R satisfying (C+R)mod 12=0 according to EVDO Rev 0 or (C+R)mod P=0 according to EVDO Rev A, wherein P=Period 3/256, and wherein Period3 is a sleep period specified in EVDO Rev A.

15. The apparatus of claim 14, wherein the means for configuring the first paging interval is configured to perform a first EVDO registration for the first subscriber identity and wherein the means for configuring the second paging interval is configured to perform a second EVDO registration for the second subscriber identity based on the same parameter R from the first EVDO registration.

16. The apparatus of claim 15, wherein the means for configuring the first paging interval is configured to perform the first EVDO registration for the first subscriber identity using a random number SessionSeed to generate the parameter R and wherein the means for configuring the second paging interval is configured to perform the second EVDO registration for the second subscriber identity by transmitting a Configuration Request with a Preferred Control Channel Cycle set to the parameter R.

17. The apparatus of claim 15, wherein the means for configuring the first paging interval is configured to perform the first EVDO registration for the first subscriber identity by:
    selecting the parameter R; and
    transmitting a first Configuration Request with a first Preferred Control Channel Cycle set to the selected parameter R; and
    wherein the means for configuring the second paging interval is configured to perform the second EVDO registration for the second subscriber identity by transmitting a second Configuration Request with a second Preferred Control Channel Cycle set to the same selected parameter R.

18. The apparatus of claim 10, wherein the apparatus comprises a mobile station (MS).

19. An apparatus for communicating in a network via a radio access technology (RAT), comprising:
    at least one processor adapted to:
    configure a first paging interval for a first subscriber identity;
    configure a second paging interval for a second subscriber identity; and
    select a same paging interval parameter for the first subscriber identity and the second subscriber identity, such that the first and second paging intervals are aligned; and
    a memory coupled to the at least one processor.

20. The apparatus of claim 19, wherein the at least one processor is adapted to monitor for a paging message for either the first or the second subscriber identity during the aligned first and second paging intervals.

21. The apparatus of claim 20, wherein the at least one processor is adapted to enter an idle state outside the aligned first and second paging intervals, wherein the at least one processor is adapted to monitor for the paging message by waking up from the idle state.

22. The apparatus of claim 19, wherein the RAT comprises Code Division Multiple Access (CDMA) Evolution-Data Optimized (EVDO) and the aligned first and second paging intervals comprise the same control channel cycle (CCC).

23. The apparatus of claim 22, wherein the CCC has an index C and the paging interval parameter comprises a parameter R satisfying (C+R)mod 12=0 according to EVDO Rev 0 or (C+R)mod P=0 according to EVDO Rev A, wherein P=Period 3/256, and wherein Period3 is a sleep period specified in EVDO Rev A.

24. The apparatus of claim 23, wherein the at least one processor is adapted to configure the first paging interval by performing a first EVDO registration for the first subscriber identity and wherein the at least one processor is adapted to configure the second paging interval by performing a second EVDO registration for the second subscriber identity based on the same parameter R from the first EVDO registration.

25. The apparatus of claim 24, wherein the at least one processor is adapted to configure the first paging interval by performing the first EVDO registration for the first subscriber identity using a random number SessionSeed to generate the parameter R and wherein the at least one processor is adapted to configure the second paging interval by performing the second EVDO registration for the second subscriber identity by transmitting a Configuration Request with a Preferred Control Channel Cycle set to the parameter R.

26. The apparatus of claim 24, wherein the at least one processor is adapted to configure the first paging interval by performing the first EVDO registration for the first subscriber identity by:
    selecting the parameter R; and
    transmitting a first Configuration Request with a first Preferred Control Channel Cycle set to the selected parameter R; and wherein the at least one processor is adapted to configure the second paging interval by performing the second EVDO registration for the second subscriber identity by transmitting a second Configuration Request with a second Preferred Control Channel Cycle set to the same selected parameter R.

27. The apparatus of claim 19, wherein the apparatus comprises a mobile station (MS).

28. A computer-program product for communicating with a mobile station (MS) in a network via a radio access technology (RAT), the computer-program product comprising:
a non-transitory computer-readable medium comprising code for:
configuring a first paging interval for a first subscriber identity of the mobile station;
configuring a second paging interval for a second subscriber identity of the mobile station; and
selecting a same paging interval parameter for the first subscriber identity and the second subscriber identity, such that the first and second paging intervals are aligned.

29. The computer-program product of claim 28, further comprising code for monitoring for a paging message for either the first or the second subscriber identity during the aligned first and second paging intervals.

30. The computer-program product of claim 29, further comprising code for entering an idle state outside the aligned first and second paging intervals, wherein monitoring for the paging message comprises waking up from the idle state.

31. The computer-program product of claim 28, wherein the RAT comprises Code Division Multiple Access (CDMA) Evolution-Data Optimized (EVDO) and the aligned first and second paging intervals comprise the same control channel cycle (CCC).

32. The computer-program product of claim 31, wherein the CCC has an index C and the paging interval parameter comprises a parameter R satisfying (C+R)mod 12=0 according to EVDO Rev 0 or (C+R)mod P=0 according to EVDO Rev A, wherein P=Period 3/256, and wherein Period3 is a sleep period specified in EVDO Rev A.

33. The computer-program product of claim 32, wherein the configuring the first paging interval comprises performing a first EVDO registration for the first subscriber identity and wherein the configuring the second paging interval comprises performing a second EVDO registration for the second subscriber identity based on the same parameter R from the first EVDO registration.

34. The computer-program product of claim 33, wherein the configuring the first paging interval comprises performing the first EVDO registration for the first subscriber identity using a random number SessionSeed to generate the parameter R and wherein the configuring the second paging interval comprises performing the second EVDO registration for the second subscriber identity by transmitting a Configuration Request with a Preferred Control Channel Cycle set to the parameter R.

35. The computer-program product of claim 33, wherein the configuring the first paging interval comprises performing the first EVDO registration for the first subscriber identity by:
selecting the parameter R; and
transmitting a first Configuration Request with a first Preferred Control Channel Cycle set to the selected parameter R; and
wherein the configuring the second paging interval comprises performing the second EVDO registration for the second subscriber identity by transmitting a second Configuration Request with a second Preferred Control Channel Cycle set to the same selected parameter R.

36. The computer-program product of claim 28, wherein the configuring the first paging interval and the configuring the second paging interval are both performed by the MS.

* * * * *